United States Patent
Ingerman et al.

(10) Patent No.: US 8,996,299 B2
(45) Date of Patent: Mar. 31, 2015

(54) GEOGRAPHIC COORDINATES CODING SOFTWARE PRODUCT

(71) Applicants: David Ingerman, Summit, NJ (US); Jude X. Huang, Millburn, NJ (US); Richard Seeger, Pacifica, CA (US)

(72) Inventors: David Ingerman, Summit, NJ (US); Jude X. Huang, Millburn, NJ (US); Richard Seeger, Pacifica, CA (US)

(73) Assignee: Place Codes, Inc., Summit, NJ (US)

( * ) Notice: Subject to any disclaimer, the term of this patent is extended or adjusted under 35 U.S.C. 154(b) by 0 days.

(21) Appl. No.: 14/010,837

(22) Filed: Aug. 27, 2013

(65) Prior Publication Data
US 2014/0074394 A1    Mar. 13, 2014

Related U.S. Application Data

(60) Provisional application No. 61/693,636, filed on Aug. 27, 2012.

(51) Int. Cl.
*G01C 21/00* (2006.01)
*G06Q 30/02* (2012.01)
*G06F 17/30* (2006.01)

(52) U.S. Cl.
CPC .......... *G01C 21/00* (2013.01); *G06F 17/30241* (2013.01); *G06Q 30/0259* (2013.01); *G06F 17/30778* (2013.01)
USPC .......................................................... 701/409

(58) Field of Classification Search
USPC .......................................................... 701/409
See application file for complete search history.

(56) References Cited

U.S. PATENT DOCUMENTS

| | | | | |
|---|---|---|---|---|
| 6,356,834 | B2 * | 3/2002 | Hancock et al. | 701/468 |
| 2009/0198954 | A1 * | 8/2009 | Sanders | 711/212 |
| 2010/0318680 | A1 * | 12/2010 | Daniel et al. | 709/245 |
| 2011/0074629 | A1 * | 3/2011 | Khan et al. | 342/357.64 |
| 2011/0306323 | A1 * | 12/2011 | Do et al. | 455/414.1 |
| 2013/0103608 | A1 * | 4/2013 | Scipioni et al. | 705/346 |

* cited by examiner

*Primary Examiner* — Mary Cheung
*Assistant Examiner* — Anne Mazzara
(74) *Attorney, Agent, or Firm* — Lawson, Persson & Weldon-Franck PC; Catherine Napjus; Michael Persson

(57) ABSTRACT

A software product for easy-to-use naming, coding, and sharing of locations, including those with no addresses.

16 Claims, 3 Drawing Sheets

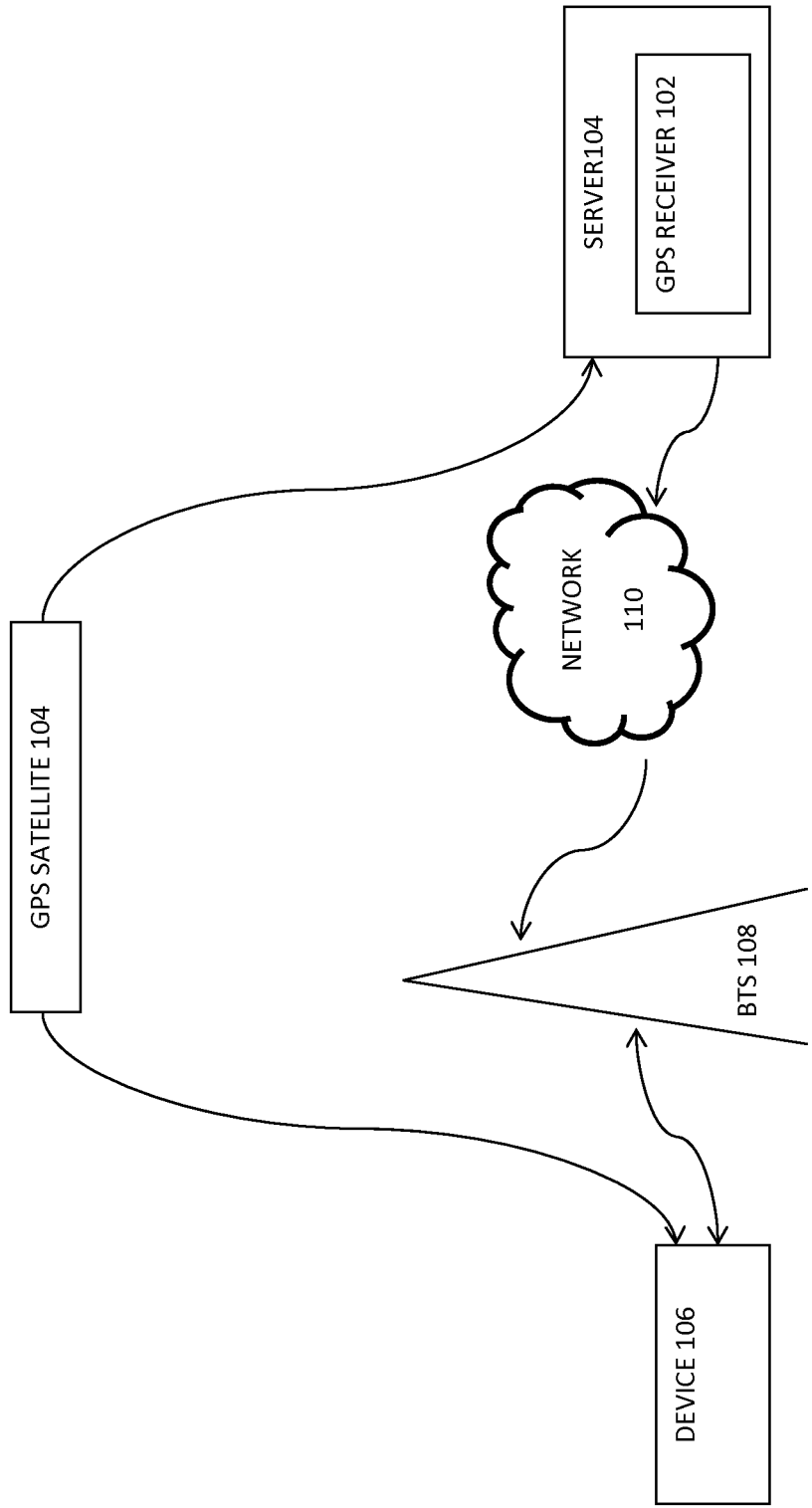

GEOGRAPHIC COORDINATES CODING SOFTWARE PRODUCT

CLAIM OF PRIORITY

This application claims the benefit of priority of U.S. Provisional Patent Application Ser. No. 61/693,636, filed on Aug. 27, 2012.

FIELD OF THE INVENTION

The present invention relates generally to coding geographic coordinates, and in particular, to identifying specific places by easy-to-remember and easy-to-use codes, rather than other, unwieldy means of location identification.

BACKGROUND

Once used solely as classified military technology, the use of global positioning systems (GPS) is now widely used in the general populous. Devices, such as Garmin® devices, may be used in cars to direct the driver based on their global position and their desired destination. Alternatively, cars frequently include built-in navigation systems that offer similar services. Smartphones also commonly include basic GPS capabilities for locating the user and directing him or her to a desired destination. Other smartphone applications, such as RunKeeper® for example, use the smartphone's GPS capabilities to track the user's path, speed, elevation, etc. . . . Despite this broad usage of GPS technology, the problem that location identification can be unwieldy and imprecise remains.

There are several common ways to identify a location. Longitude and latitude coordinates may be extremely precise, but are extremely unwieldy to relay to a GPS device or another person. One might tell a friend to meet him at specific GPS coordinates, which may precisely indicate one's location, but the long strings of numbers are neither easily remembered, nor communicated, nor entered into a device with GPS capabilities. Physical addresses are another common way to identify a location. Again, remembering, communicating, and/or entering addresses can be difficult at times, especially when the address is long—1327 Foothill Boulevard, La Cañada Flintridge, Calif., for example. Moreover, some addresses are ambiguous and are not easily input into a GPS device. For an address such as, 1454 US RTE 22 West, Union, N.J., for example, a GPS device might not recognize the input of "Route 22" or "Rte. 22," but may, unbeknownst to the user, instead require "US RTE 22" exactly in order to recognize the address. Finally, locations may be identified informally, such as "soccer field #3," "parking lot B," "the East side entrance to the Central Park reservoir," or "the dragon ride at Alpha Amusement Park." Such informal location identifications that don't necessarily have an address are particularly prone to confusion and miscommunication. All of these types of locations and others may need to be communicated from time to time, and all have their disadvantages as far as simple, precise location communication.

Google™ Place Pages provides a service where a business may be provided with a QR code associated with that the business. One who scans such a QR code is provided with information about the business and an option to click for maps or directions to that location. Although a useful tool, this service does not appear to accept input of locations other than addresses, nor does it provide simple process to simply scan for directions, and as such, does not address many of the situations outlined above.

Therefore there is a need for easy assignation and communication of precise coordinates of a specific location.

SUMMARY OF THE INVENTION

The present invention is a software product and smartphone application for easy-to-use coding of locations and accurate transmittal of such codes to devices that can use them.

The location identification software product of the present invention takes a physical location as an input and creates a code specific to that location. The software product is tangibly stored on a non-transitory storage device and causes a data processing device to perform the various operations described herein. Many of the operations involve receiving or transmitting various data. The main data processing device may be receiving or transmitting data from any device capable of transmitting data to and receiving data from the data processing device. Any internet-capable device, such as a desktop computer, laptop computer, tablet computer, or smartphone, for example, may communicate with the main data processing device of the present invention. Information received by the data processing device may therefore be typed, scanned, spoken, tapped, clicked, or otherwise selected or input for transmission to the main data processing device. Some operations are performed by a central server, which is the main data processing device. Some operations are performed according to software downloaded from the central server to the device in communication with the server, such as a smartphone application downloaded to a smartphone. With such latter operations, any information transmitted from or received by the device through the software downloaded on the device is still transmitted to or received by the server even if some of the functions are being performed locally by the device. For such operations, the device on which the software downloaded from the central server and the central server are both data processing devices of the present invention.

The location identification software product includes code creation software code, code saving software code, a database, code sharing software code, code selection software code, directions software code, and payment software code. Creation software code creates the code that is associated with the physical location. Code creation software code includes location input software code, automated code provision software code, code customization software code, customized code acceptability software code, note addition software code, and public/private option software code. Location input software code allows for the input of the location to be coded. A location may be inputted by several means including typing an address, typing GPS coordinates, using the user's current location, selecting a map location, searching for a location using a search engine, typing a zip code+four, or plotting polygon points on a map to select an area rather than a point. Location input by selecting a map location or plotting polygon points is accomplished using an electronic map. These options include choices for selecting locations that have no street address, such as a spot on a hiking trail, on a beach or in a park. An electronic map is a computerized depiction of a map where a user may select locations within the map.

Once the location is inputted, automated code provision software code is executed. Automated code provision software code provides the user with a code associated with the inputted location. The code is alphanumeric, and may also be displayed optionally as a QR code or bar code. The code is easily speakable into a device that accepts spoken commands.

The user may then choose to execute code customization software code to choose a different alphanumeric code for the inputted location other than the one automatically generated by automated code provision software code. The user would do this by inputting a preferred alphanumeric grouping. If code customization software code is executed by the input of a requested customized code, customized code acceptability software code is also executed. Customized code acceptability software code checks for availability of the requested preferred alphanumeric grouping against a list of non-available alphanumeric codes. For example, if a restaurant owner wants to code his location "OriginalRays," he can check to see if that code is available. Alphanumeric codes may be non-available either because they are already used as a code for another location or because they have been reserved. Codes may be reserved for several reasons. A code containing a very desirable word or generic term, "pizza" for example, may be reserved for users willing to pay to have a code with that word. Codes containing trademarks or domain names may also be reserved. Customized code acceptability software code also checks acceptability of the requested preferred alphanumeric grouping as far as rules for the code. Rules may be as simple as: the alphanumeric code must include at least one letter or number. More complex rules may be that the alphanumeric code must be at least eight characters long and include at least one letter, one number, and one symbol.

Once a user has been provided with an acceptable code, the user may input notes associated with the code or the location it represents through note addition software code. Public/private option software code may also be executed, which allows a user to choose whether the code will be public or private.

The location identification software product also includes saving software code, the database, and code sharing software code. Saving software code is executed to save inputted location information, any codes subsequently associated with that location, any notes associated with the code and location, and whether the code and any notes are public or private. All of this information saved through saving software code is saved in the database. Code sharing software code allows a user to share the code through various means, such as email, social media, texting, website posting, or sound recording. Message customization software code may also be executed as a part of code sharing software code to customize a message or post included with the code.

The location identification software product also includes code selection software code, directions software code, and payment software code. Code selection software code allows the recipient of a code shared through code sharing software code to select the shared code and learn the location associated with the shared code and any other information attached to the code, such as notes. Once the recipient has selected the shared code and been presented with the information, he may choose to execute the directions software code, which will provide the recipient with directions to the coded location from the recipient's location or from another location provided by the recipient. If directions are to be provided from the recipient's location, the recipient's device must be GPS-enabled. GPS-enablement is not necessary if the directions are to be provided from another location input into the recipient's device. Directions software code may also provide reverse directions from the coded location to the recipient's location or to another location provided by the recipient.

Payment software code allows for users to pay for the execution of code creation software code. One of ordinary skill in the art will recognize that there are many different payment structures for such a service as described above.

Each of these variations is considered to be within the scope of the present invention. It is preferred, however, that code creation be free for both consumers and businesses for non-premium names. Premium code names or generic terms, such as those including desirable words like "pizza," "coffee," "gas," or "lawyer" may be reserved and only assigned to a location upon payment. Such premium code names may be akin to domain names, such as "wine.com", "lawyers.com", or "books.com." Premium code names may also include trademarks and trade names. Premium code names are stored in the database and are only released for assignment upon execution of payment software code.

One of ordinary skill in the art will recognize that the location identification software product and its features may be executed by any device having internet capabilities, including desktop, laptop, and tablet computers, as well as smartphones, which are mobile phones having computer capabilities beyond telephonic capabilities, especially including internet capabilities. It is preferable that the device also include GPS capabilities for improved accuracy.

Although not all features described herein are claimed, it is understood that the inventor considers each feature described herein to be a part of the invention.

The software product and smartphone application of the present invention may be used to great advantage in many scenarios. In a first case, with the current state of the art, a soccer coach might send the following long and convoluted message to the parents of his players:

This week's game is at Veteran's Field #3 in Lake Hopatcong, N.J. Depending on your GPS, you should be able to just enter 126 East Flora Road, Lake Hopatcong, N.J. 07843, which appears to be the nearest street address, but I'm not sure where the entrance is. Their coach said to park in parking lot B which is the closest lot to our field. I found directions on the team's website, which say: Take I-80 to exit 28 or Route 46 to Route 631 Northbound to traffic light. Turn left onto Lakeside. Follow Lakeside several miles up through two lights. Turn left onto Brooklyn-Stanhope Road for just under a mile (stone house on the corner of Flora and Brooklyn-Stanhope). Turn right onto Flora. Follow Flora—Fields are located on the left side of Flora.

In preparation for the day of the game, the parent searches for the field; reviews the map to try to find field #3 or lot B; gives up and enters 41 characters of a nearby address into a GPS device, "126 East Flora Road, Lake Hopatcong, N.J."; arrives at that nearby address; and searches for the field and parking lot once there.

With the present invention, the coach would send:

This week's game is at Veteran's Field #3 in Hopatcong, N.J. Use Code NJVetFieldB. The notes attached to this code would include that Parking Lot B is next to the field. The parent would enter the 11 characters of NJVetFieldB into a GPS device and be directed directly to the field and parking lot. As this example shows, a great deal of time, effort, confusion, and frustration may be saved using the present invention.

In a second case, the user needs to get to a specific part of a large complex. Specifically, he needs to get to the Princeton University Pool. In the current state of the art, he goes online and searches for "Princeton University Pool." He clicks on several search results before coming upon an actual address or map of the university. With the present invention, a Princeton student or facility manager may have created a code, "TigersPool" and made the code public and therefore searchable. The user searches for the code, easily finds it, and is provided with perfect directions to the pool.

In a final case, a user is shopping online. In the current state of the art, he needs to enter multiple address fields each time he visits a new e-commerce site. He is uncomfortable sharing his personal information, including his home address, with these new unknown sites. With the present invention, the user can enter his address once to create a code for it. He can then use this code with participating e-commerce websites in the future, thereby saving the repeated typing in of his address, and preserving his privacy by not disclosing his actual address, but only the code associated with it.

Therefore it is an aspect of the present invention to provide short, memorable codes for a location.

It is a further aspect of the present invention to make these codes public or private.

It is a further aspect of the present invention to obfuscate an actual address associated with the encoded location.

It is a further aspect of the present invention to code a location that does not have an address.

It is a further aspect of the present invention to automatically provide speakable codes.

It is a further aspect of the present invention to allow for customization of the automatically provided codes.

It is a further aspect of the present invention to provide a fully integrated process enabling a user to specify an exact location, name it, and communicate it.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIG. 3 is a diagram showing communication between the various components that perform the functions of the software product of the present invention.

DETAILED DESCRIPTION

Figure 1:
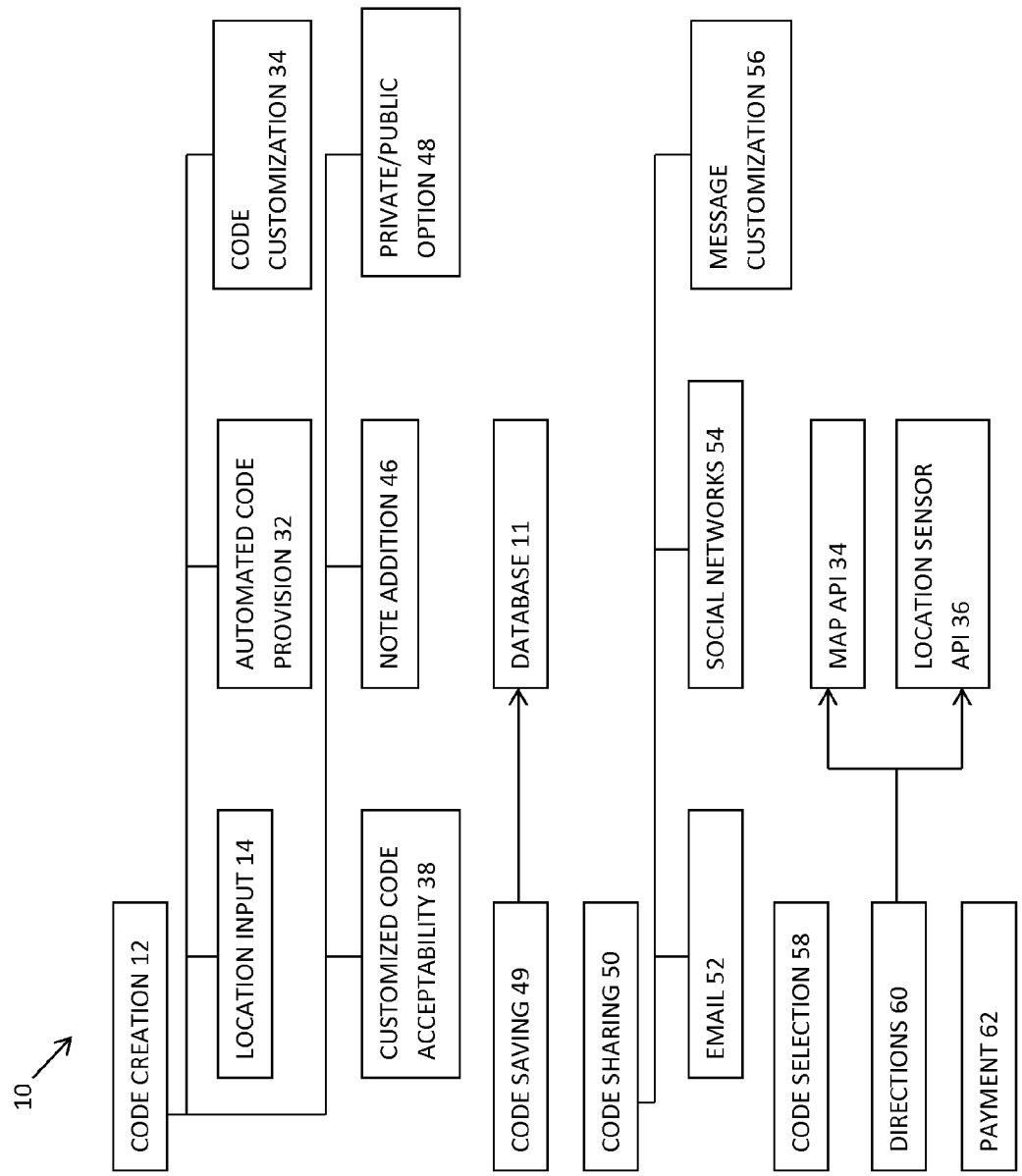
FIG. 1 is a block diagram showing the functionality of the software product of the present invention.
Figure 2:
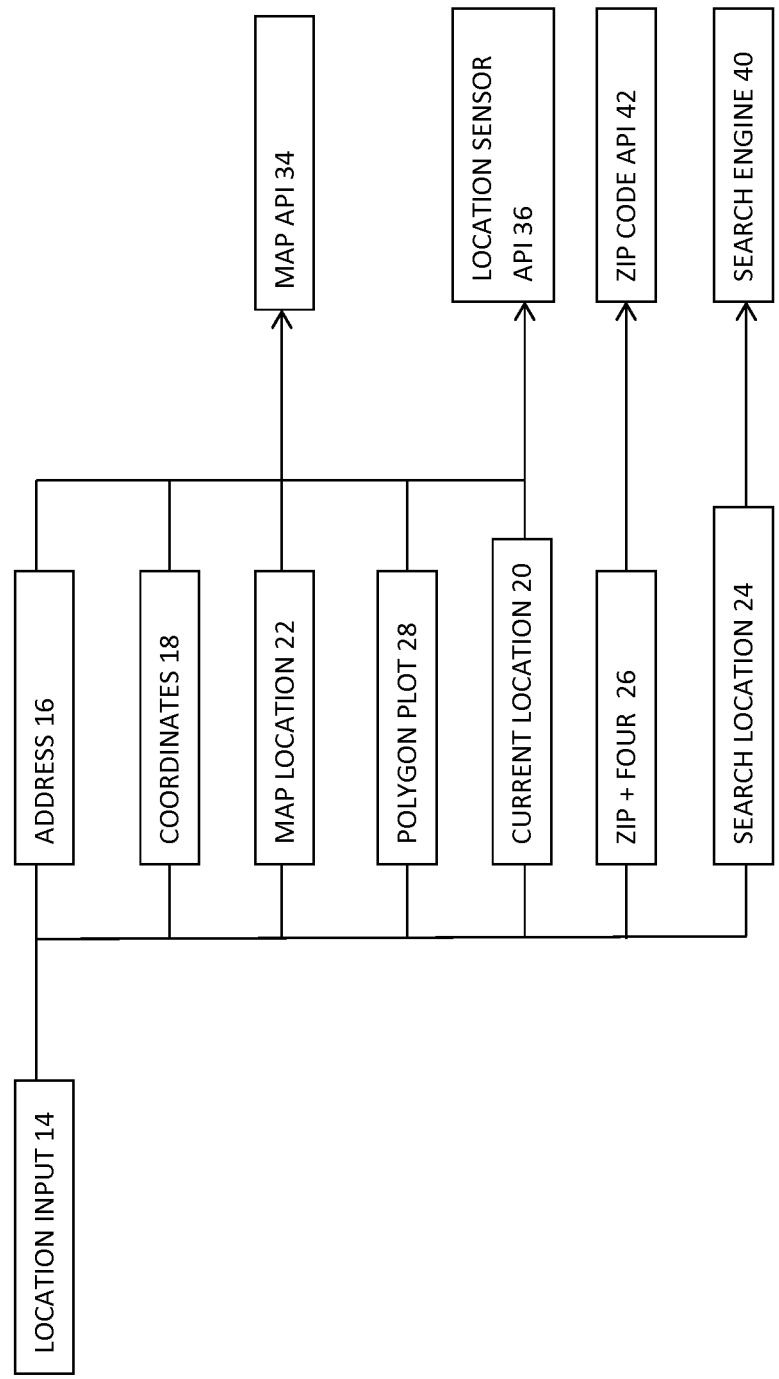
FIG. 2 is a block diagram detailing the functionality of the location input function of the software product of the present invention.

Referring to FIGS. 1 and 2, the features of location identification software product 10 are shown. Location identification software product 10 includes code creation software code 12, code saving software code 49, database 11, code sharing software code 50, code selection software code 58, directions software code 60, and payment software code 62.

Code creation software code 12 allows for the creation of a code associated with a physical location. Code creation software code 12 includes location input software code 14, automated code provision software code 32, code customization software code 34, customized code acceptability software code 38, note addition software code 46, and public/private option software code 48. Location input software code 14 is detailed in FIG. 2 and allows for the input of the location to be coded. A location may be inputted by several means including typing an address 16, typing GPS coordinates 18, using current location 20, selecting a map location 22, searching for a location 24, typing a zip code+four 26, or plotting polygon points 28. For each example including the act of "typing" something for input, it is recognized that some devices, especially tablet computers and smartphones, may include voice recognition capabilities so that the input may not be through typing but through speaking to the device. For inputting options such as typing an address 16, typing GPS coordinates 18, selecting a map location 22, or plotting polygon points 28, a map application programming interface (API) 34, such as Google Maps® may be incorporated into code creation software code 12 so as to properly identify the location. For inputting options such as using current location 20, in which a user selects to code his current location, a location sensor API 36 and or map API 34 may be incorporated into code creation software code 12 so as to properly identify the location. For inputting options such as searching for a location 24, in which a user searches for a specific location, business, or address, and selects a search result for coding, a search engine API 40, such as the Google® search engine or Google Places® API, may be incorporated into code creation software code 12 so as to properly identify the location. For inputting options such as typing a zip code+four 26, a zip code API 42, such as the USPS zip code look-up, may be incorporated into code creation software code 12 so as to properly identify the location. Plotting polygon points 28 involves choosing to identify a shape on a map and selecting three or more points on that map and connecting them to plot the polygon. Plotting polygon points 28 is most useful for identifying a larger area than a specific point. Plotting polygon points 28 may be used to code the location of Disneyland or SOHO, for example. One of ordinary skill in the art will recognize that these are but a few examples of means for inputting a location and that there are many equivalent means for doing so, each of which is considered to be within the scope of the present invention.

Once the location is inputted, automated code provision software code 32 is executed. Automated code provision software code 32 provides the user with a code associated with the inputted location. The code is alphanumeric, but may also be displayed as a QR code or bar code. The code is easily speakable into a device that accepts spoken commands. The user may then choose to execute code customization software code 34 to choose a different alphanumeric code for the inputted location other than the one automatically generated by automated code provision software code 32. If code customization software code 34 is executed by the input of a requested customized code, customized code acceptability software code 38 is also executed. Customized code acceptability software code 38 checks for availability of the requested customized code, acceptability of the requested customized code as far as rules for the code, e.g. that it must contain at least one letter, one number, and one symbol, and whether the requested customized code is a code that has been reserved. Codes may be reserved for several reasons. A code containing a very desirable word, "pizza" for example, may be reserved for users willing to pay to have a code with that word. Codes containing trademarks may also be reserved.

Once a user has been provided with an acceptable code through automated code provision software code 32 or has chosen a code through code customization software code 34 that has been deemed acceptable through customized code acceptability software code 38, the user may input notes associated with the code or the location it represents through note addition software code 46. Notes that may be associated with the code and/or location may be personal, such as "Meeting in back room," "Meet me here at 9 pm on Saturday," or "Come around to the back of the house." Alternatively, if the user is a business, the notes may include information it wishes to display about the business, such as menu items if the business is a restaurant, or brands sold if the business is a retail store. In addition, notes may include special deals or aspects of a business, such as "Sunday brunch available." For codes made public, these notes will be searchable with an internet search engine, so the notes may bring in business. If Summit Diner in Summit, N.J. has a code with a note attached including "Sunday brunch available," for example, and someone performs an internet search for "Summit N.J. Sunday brunch," then Summit Diner's code and attached notes will be among the search results. Public/private option software code 48 may also be executed, which allows a user to choose whether the code will be public or private. Using the examples above, if the user is sending a code with the "Meet me here at 9 pm on Saturday" note to his date, he will likely make the code private so that only his date will have access to the code. A business such as Summit Diner, on the other hand, will likely want their code and attached notes to be public so that anyone can find the restaurant and search for it on the internet as in the example given above.

In addition to code creation software code 12, location identification software product 10 includes saving software code 49 and database 11. Saving software code 49 is executed to save inputted location information through location input software code 14, any codes subsequently associated with that location through automated code provision software code 32 or code customization software code 34, any notes associated with the code and location through note addition software code 46, and whether the code and any notes are public or private as determined by the execution of public/private option software code 48. All of this information saved through saving software code 49 is saved in database 11.

Location identification software product 10 also includes code sharing software code 50. Code sharing software code 50 allows a user to share the code through various means such as email 52 or social media products 54, such as Twitter® or FaceBook®. If the user executes code sharing software code 50 through email 52 or social media products 54, the user may be prompted to log into the email 52 or social media 54 account if he is not already logged in. Message customization software code 56 may also be executed as a part of code sharing software code 50 to customize a message or post included with the code. The "Meet me here at 9 pm on Saturday" message, for example, may not be attached in the notes added to the code through note addition software code 46, but may instead by added as part of a Twitter® post through message customization software code 56.

Location identification software product 10 also includes code selection software code 58. Code selection software code 58 allows the recipient of a code shared through code sharing software code 50 to select the shared code and learn the location associated with the shared code and any other information attached to the code, such as notes associated with the code through note addition software code 46. Once the recipient has selected the shared code and been presented with the information, he may choose to execute directions software code 60. Directions software code 60 may use map 34 and/or location sensor 36 APIs to provide the recipient with directions to the coded location from the recipient's location or from another location provided by the recipient.

Location identification software product 10 also includes payment software code 62. Payment software code 62 allows for users to pay for the execution of code creation software code 12. One of ordinary skill in the art will recognize that there are many different payment structures for such a service as described above. Each of these variations is considered to be within the scope of the present invention. It is preferred, however, that code creation be free for both consumers and businesses for non-premium names. Premium code names, such as those including common and desirable words like "pizza," "coffee," "gas," or "lawyer" may be reserved and only assigned to a location upon payment. Premium code names may also include trademarks and trade names. Premium code names are included in database 11 and may be—released for assignment only upon execution of payment software code 62.

One of ordinary skill in the art will recognize that location identification software product 10 and its features may be executed by any device including internet—capabilities, including desktop, laptop, and tablet computers, as well as smartphones, which are mobile phones having computer capabilities beyond telephonic capabilities, especially including internet capabilities. It is preferable that the device also include GPS capabilities for improved accuracy.

Now referring to FIG. 3, a diagram showing communication between various components that perform the functions of the software product of the present invention is provided. Server 100 is the main data processing device that performs the software functions described herein. Server 100 includes GPS receiver 102 that provides server 100 with the capability to receive information from GPS Satellite 104. GPS Satellite 104 detects the location of device 106 and relays it to server 100. Device 106 is in communication with base transceiver station (BTS) 108. Server 100 is also in communication with BTS 108 through network 110. The user of device 106 can request that server 100 create a code based on the location of device 106. In addition, if the user of device enters a code and transmits it to server 100, server 100 may provide the user with directions to or from the encoded location based on the user's position as relayed through GPS satellite 104.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

We claim:

1. A software product tangibly stored on a non-transitory storage device, the product configured to cause at least one data processing device to perform operations comprising:
   receiving a location input;
   receiving a preferred alphanumeric grouping;
   checking availability of the preferred alphanumeric grouping against a list of non-available alphanumeric codes;
   checking attributes of the preferred alphanumeric grouping against a set of rules for preferred alphanumeric codes;
   creating an alphanumeric code that is the preferred alphanumeric grouping and associated with the inputted location;
   receiving an alphanumeric code input into a device that is GPS-enabled and able to transmit information to and receive information from said at least one data processing device, wherein the alphanumeric code was created by said software product and is associated with a location;
   providing the location associated with the alphanumeric code;
   receiving a second location by detecting a location of the GPS-enabled device; and
   transmitting to the GPS-enabled device directions from the location of the GPS-enabled device to the location associated with the alphanumeric code.

2. The software product as claimed in claim 1, wherein said operation of receiving a location input comprises receiving an address.

3. The software product as claimed in claim 1, wherein said operation of receiving a location input comprises receiving GPS coordinates.

4. The software product as claimed in claim 1, wherein said operation of receiving a location input comprises receiving a current location of a GPS-enabled device able to transmit the current location to said at least one data processing device.

5. The software product as claimed in claim 1, wherein said operation of receiving a location input comprises receiving an indication of a location on an electronic map.

6. The software product as claimed in claim 1, wherein said operations further comprise:
receiving a selection that the alphanumeric code be one of a group consisting of public and private; and
making the alphanumeric code the one of a group consisting of public and private based on the selection received.

7. The software product as claimed in claim 1, wherein said operations further comprise:
providing an option to share the alphanumeric code;
receiving an input requesting that the alphanumeric code be shared, wherein sharing the alphanumeric code comprises one of a group consisting of emailing the code, texting the code, posting the code via social media, posting the code on a website, and providing a voicemail recording of the code; and
sharing the alphanumeric code as requested.

8. The software product as claimed in claim 1, wherein:
said operations further comprise receiving notes input, wherein notes are additional information about the inputted location;
said operation of creating an alphanumeric code associated with the inputted location comprises creating an alphanumeric code associated with the inputted location and notes; and
said operation of providing a location associated with the alphanumeric code comprises providing a location and notes associated with the alphanumeric code.

9. The software product as claimed in claim 8, wherein the input location is a business and said operation of receiving notes input comprises receiving offers associated with the location.

10. The software product as claimed in claim 1, wherein the preferred alphanumeric grouping comprises one of a group consisting of a trademark, a domain name, and a generic term, and wherein said operations further comprise:
indicating payment is due for the creation of the alphanumeric code; and
receiving payment.

11. The software product as claimed in claim 8, wherein said non-transitory storage device comprises a database, and said operations further comprise:
receiving a selection that the alphanumeric code be one of a group consisting of public and private;
making the alphanumeric code the one of a group consisting of public and private based on the selection received; and
saving information into said database, wherein said information comprises:
inputted locations;
notes;
selections that an alphanumeric code be one of a group consisting of public and private; and
the alphanumeric code associated with the inputted locations, notes, messages, and selections that an alphanumeric code be one of a group consisting of public and private.

12. A software product tangibly stored on a non-transitory storage device comprising a database, said product configured to cause at least one data processing device to perform operations comprising:
receiving a location input;
receiving notes input, wherein notes are additional information about the inputted location;
creating a QR code associated with the inputted location and notes;
receiving a selection that the QR code be one of a group consisting of public and private, wherein private entails stricter access standards;
making the QR code the one of a group consisting of public and private based on the selection received;
saving information into said database, wherein said information comprises:
inputted locations;
notes;
selections that a QR code be one of a group consisting of public and private; and
the QR code associated with the inputted locations, notes, and selections that a QR code be one of a group consisting of public and private;
receiving a scan of a QR code from a device that is GPS-enabled, able to scan QR codes, and able to transmit information to and receive information from said data processing device, wherein the QR code was created by said software product;
providing the location and notes associated with the QR code;
providing an option to provide directions to the location associated with the QR code;
receiving a request to provide directions to the location associated with the QR code;
receiving a current location of the GPS-enabled device from the GPS-enabled device; and
transmitting to the GPS-enable device directions from the current location of the GPS-enabled device to the location associated with the OR code.

13. The software product as claimed in claim 12, wherein said step of receiving a location input comprises the step of receiving GPS coordinates.

14. The software product as claimed in claim 12, wherein said step of receiving a location input comprises the step of receiving a current location of a GPS-enabled device able to transmit the current location to said data processing device.

15. The software product as claimed in claim 12, wherein said step of receiving a location input comprises the step of receiving an indication of a location on an electronic map.

16. The software product as claimed in claim 12, wherein said operations further comprise:
providing an option to share the QR code;
receiving an input requesting that the alphanumeric code be shared, wherein sharing the QR code comprises one of a group consisting of emailing the code, texting the code, posting the code via social media, and posting the code on a website; and
sharing the QR code as requested.

* * * * *